(12) United States Patent
Shehan et al.

(10) Patent No.: US 10,968,839 B2
(45) Date of Patent: Apr. 6, 2021

(54) ELECTRONIC FUEL INJECTION THROTTLE BODY ASSEMBLY

(71) Applicant: Holley Performance Products, Inc., Bowling Green, KY (US)

(72) Inventors: Laura Shehan, Bowling Green, KY (US); Amy Gieske, Loogootee, IN (US); Jonathan Sams, Woodburn, KY (US); Adam Layman, Alvaton, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 16/208,246

(22) Filed: Dec. 3, 2018

(65) Prior Publication Data

US 2019/0170069 A1  Jun. 6, 2019

Related U.S. Application Data

(60) Provisional application No. 62/594,527, filed on Dec. 4, 2017.

(51) Int. Cl.
*F02D 9/10* (2006.01)
*F02M 35/10* (2006.01)
(Continued)

(52) U.S. Cl.
CPC .............. *F02D 9/104* (2013.01); *F02D 9/105* (2013.01); *F02M 35/10216* (2013.01);
(Continued)

(58) Field of Classification Search
CPC .......... F02D 9/104; F02D 9/105; F02D 9/107; F02D 35/0053; F02D 35/0076; F02D 35/0084; F02M 61/18; F02M 35/104; F02M 35/10032; F02M 35/10085; F02M 35/10216; F02M 35/10196; F02M 35/044; F02M 35/10019; F02M 35/10177; F02M 69/043; F02M 69/044; F02M 69/462
See application file for complete search history.

(56) References Cited

U.S. PATENT DOCUMENTS 4,224,908 A  9/1980  Bier et al.
4,230,645 A  10/1980  Dodson
(Continued)

FOREIGN PATENT DOCUMENTS

AU  339157  10/2011
AU  341133  2/2012
(Continued)

OTHER PUBLICATIONS

U.S. Appl. No. 29/628,392 entitled "EFI Throttle Body" filed Dec. 4, 2017.
(Continued)

*Primary Examiner* — George C Jin
(74) *Attorney, Agent, or Firm* — Middleton Reutlinger

(57) ABSTRACT

Present embodiments provide a throttle body which may be used with a variety of engines of different manufacturers. The throttle body may be used to replace mechanical or hydraulically controlled carburetors with electronic fuel injection. The throttle body may provide improved fuel pathways and fuel injector placement.

12 Claims, 13 Drawing Sheets

(51) Int. Cl.
*F02M 61/18* (2006.01)
*F02M 69/04* (2006.01)
*F02D 9/02* (2006.01)

(52) U.S. Cl.
CPC .......... *F02M 61/18* (2013.01); *F02M 69/042* (2013.01); *F02D 9/02* (2013.01); *F02D 9/107* (2013.01); *F02D 2400/11* (2013.01); *F02M 69/043* (2013.01); *F02M 69/044* (2013.01)

(56) References Cited

U.S. PATENT DOCUMENTS

| | | | |
|---|---|---|---|
| 4,246,875 | A | 1/1981 | Bier et al. |
| 4,294,282 | A | 10/1981 | McCabe et al. |
| 4,306,441 | A | 12/1981 | Dodson |
| 4,318,214 | A | 3/1982 | Dodson |
| 4,325,339 | A | 4/1982 | Bier et al. |
| 4,357,283 | A | 11/1982 | Manning |
| 4,434,762 | A | 3/1984 | McCabe |
| 4,434,763 | A | 3/1984 | McCabe et al. |
| 4,556,032 | A | 12/1985 | Miller |
| 4,949,983 | A | 8/1990 | Miller |
| 5,012,780 | A * | 5/1991 | Bugamelli .............. F02B 67/00 123/478 |
| 5,261,382 | A | 11/1993 | Nikolai |
| D447,147 | S | 8/2001 | Grant |
| 6,408,811 | B1 * | 6/2002 | Glovatsky ................. F02D 9/02 123/184.61 |
| 6,481,698 | B1 | 11/2002 | Calvin et al. |
| 6,502,547 | B2 * | 1/2003 | Kennedy .......... F02M 35/10216 123/143 C |
| 6,688,290 | B2 * | 2/2004 | Zehnal ............. F02M 35/10327 123/468 |
| D508,496 | S | 8/2005 | Grant |
| D543,555 | S | 5/2007 | Braswell et al. |
| 7,225,777 | B2 * | 6/2007 | Barrena .................... F02F 1/24 123/143 C |
| D555,668 | S | 11/2007 | Benoit |
| D578,550 | S | 10/2008 | Benoit |
| 7,533,661 | B2 | 5/2009 | Baasch |
| 7,591,245 | B2 | 9/2009 | Baasch et al. |
| D645,058 | S | 9/2011 | Benoit |
| D648,746 | S | 11/2011 | Tipton et al. |
| D655,311 | S | 3/2012 | Gieske et al. |
| D659,714 | S | 5/2012 | Gieske et al. |
| D721,389 | S | 1/2015 | Gieske et al. |
| 9,115,671 | B2 | 8/2015 | Benoit |
| 9,303,578 | B2 | 4/2016 | Wittkopf et al. |
| 9,376,997 | B1 * | 6/2016 | Farrell ................... F02M 69/52 |
| D760,804 | S | 7/2016 | Shehan et al. |
| 9,482,198 | B1 | 11/2016 | Farrell et al. |
| 9,845,740 | B2 * | 12/2017 | Wittkopf .......... F02M 35/10216 |
| D808,435 | S | 1/2018 | Shehan et al. |
| D810,142 | S | 2/2018 | Shehan et al. |
| 10,012,197 | B2 | 7/2018 | Flynn et al. |
| D826,280 | S | 8/2018 | Koo et al. |
| 10,094,353 | B2 | 10/2018 | Bennett et al. |
| 10,294,902 | B2 | 5/2019 | Shehan et al. |
| 2002/0148454 | A1 * | 10/2002 | Itoh .......................... F02D 41/28 123/647 |
| 2005/0045147 | A1 * | 3/2005 | Ishikawa .......... F02M 35/10039 123/336 |
| 2008/0230034 | A1 | 9/2008 | Dunn |
| 2008/0276908 | A1 * | 11/2008 | Murakami .............. F02D 11/10 123/478 |
| 2009/0013955 | A1 | 1/2009 | Sheridan et al. |
| 2009/0145406 | A1 * | 6/2009 | Farrell ............. F02M 35/10032 123/470 |
| 2011/0120413 | A1 * | 5/2011 | Runia ................... F02D 9/1035 123/337 |
| 2013/0054121 | A1 | 2/2013 | Casoni et al. |
| 2013/0081594 | A1 * | 4/2013 | Schwulst ............ B29C 45/0017 123/337 |
| 2013/0298871 | A1 | 11/2013 | Bennett et al. |
| 2015/0108256 | A1 | 4/2015 | Flynn et al. |
| 2017/0198672 | A1 | 7/2017 | Farrell et al. |
| 2018/0119656 | A1 | 5/2018 | Shehan et al. |
| 2019/0170069 | A1 | 6/2019 | Shehan et al. |
| 2019/0170070 | A1 | 6/2019 | Shehan et al. |

FOREIGN PATENT DOCUMENTS

| | | |
|---|---|---|
| AU | 348732 | 5/2013 |
| AU | 348733 | 5/2013 |
| AU | 348734 | 5/2013 |
| AU | 356762 | 8/2014 |
| AU | 201710470 | 2/2017 |
| AU | 201710471 | 2/2017 |
| AU | 2013254906 | 11/2017 |
| AU | 201813353 | 8/2018 |
| AU | 201813355 | 8/2018 |
| AU | 201815034 | 9/2018 |
| AU | 201815036 | 9/2018 |
| AU | 201816623 | 12/2018 |
| AU | 201816624 | 12/2018 |
| CN | 101568711 | 4/2013 |
| EM | 003729599 | 1/2017 |

OTHER PUBLICATIONS

Holley Performance Products, Inc., 2017 New & Hot Products Catalogue—Carburetors, Nov. 1, 2016.
U.S. Appl. No. 62/594,526 entitled "Electronic Fuel Injection Throttle Body Assembly" filed Dec. 4, 2017.
Australian Patent Application No. 2017251869 entitled "Electronic Fuel Injection Throttle Body Assembly" filed Oct. 30, 2017.
U.S. Appl. No. 62/594,527 entitled "Electronic Fuel Injection Throttle Body Assembly" filed Dec. 4, 2017.
U.S. Appl. No. 29/628,394 entitled "EFI Throttle Body" filed Dec. 4, 2017.
U.S. Appl. No. 62/669,052 entitled "Electronic Fuel Injection Throttle Body Assembly" filed May 9, 2018.
U.S. Appl. No. 15/986,571 entitled "Fuel Injection Throttle Body" filed May 22, 2018.
U.S. Appl. No. 29/688,819 entitled "Electronic Fuel Injection Throttle Body" filed Apr. 24, 2019.
U.S. Appl. No. 29/647,060 entitled "Electronic Fuel Injection Throttle Body" filed May 9, 2018.
U.S. Appl. No. 62/669,094 entitled "Electronic Fuel Injection Throttle Body Assembly" filed May 9, 2018.
U.S. Appl. No. 62/726,723 entitled "Electronic Fuel Injection Throttle Body Assembly" filed Sep. 4, 2018.
Mopar Performance P5249686 Jeep MPI-Fuel, Sep. 2, 2016.
Howell EFI Fuel Injection Conversion Kit, JP258, Apr. 29, 2015.
F.A.S.T. EZ-EFI Self-Tuning Fuel Injection Systems 30294-Kit TBI Converstion Kit, Jun. 30, 2015.
U.S. Appl. No. 29/693,670 entitled "Electronic Fuel Injection Throttle Body Assembly" filed Jun. 4, 2019.
International Search Report and Written Opinion for PCT/US2018/063660 dated Mar. 20, 2019.
International Search Report and Written Opinion for PCT/US2018/063668 dated Mar. 20, 2019.
Canadian Design Patent Application No. 184483 entitled "Electronic Fuel Injection Throttle Body" filed Oct. 31, 2018.
Canadian Design Patent Application No. 184482 entitled "Electronic Fuel Injection Throttle Body" filed Oct. 31, 2018.
Mexican Design Patent Application No. MX/f/2018/003332 entitled "Electronic Fuel Injection Throttle Body" filed Nov. 8, 2018.
Mexican Design Patent Application No. MX/f/2018/003333 entitled "Electronic Fuel Injection Throttle Body" filed Nov. 8, 2018.
U.S. Appl. No. 29/647,068 entitled "Electronic Fuel Injection Throttle Body" filed May 9, 2018.
U.S. Appl. No. 16/389,227 entitled "Electronic Fuel Injection Throttle Body Assembly" filed Apr. 19, 2019.
U.S. Appl. No. 16/405,519 entitled "Electronic Fuel Injection Throttle Body Assembly" filed May 7, 2019.
U.S. Appl. No. 16/404,308 entitled "Electronic Fuel Injection Throttle Body Assembly" filed May 6, 2019.

(56) References Cited

OTHER PUBLICATIONS

International Search Report and Written Opinion for PCT/US2019/030909 dated Aug. 20, 2019.
International Search Report and Written Opinion for PCT/US2019/031138 dated Aug. 27, 2019.
Youtube video, "Holley Terminator EFI Kit Electronic Fuel Injection", May 6, 2015. Retrieved from https://www.youtube.com/watch?v=hrTppUkNAn0; retrieved on Jul. 1, 2019.
The International Bureau of WIPO, International Preliminary Report on Patentability for PCT App. No. PCT/US2018/063668 dated Jun. 9, 2020, 10 pages.
Australian National Stage Application No. 2018378315 entitled "Electronic Fuel Injection Throttle Body Assembly" national stage entry date Jun. 26, 2020.

* cited by examiner

ELECTRONIC FUEL INJECTION THROTTLE BODY ASSEMBLY

CLAIM TO PRIORITY

This non-provisional patent application claims priority to and benefit of, under 35 U.S.C. § 119(e), U.S. Provisional Patent Application Ser. No. 62/594,527, filed Dec. 4, 2017 and titled "Electronic Fuel Injection Throttle Body Assembly", all of which is incorporated by reference herein.

BACKGROUND

Field of the Invention

Present embodiments related to throttle body fuel injection systems intended to replace existing carburetors. More specifically, present embodiments relate to retrofitting carbureted engines with electronic fuel injection (EFI) which may be mounted on a manifold of an internal combustion engine and have numerous features including similar size, improved performance, ease of installation and the like.

Description of the Related Art

Replacement throttle body systems are utilized to provide carburetor replacement while having improved performance of electronic fuel injection. This is desirable for higher performance engines or improving performance and consistency of older engines.

However, when installing these systems, there are multiple variables related to size of throttle body, space on the engine and relative to the vehicle hood, space relative to surrounding engine components.

Prior art devices are often fully mechanical or hydraulic which over time can lead to decrease in proper function. Further, variations in atmospheric temperature and pressure, engine temperature, load and speed are all variable rendering difficult to maximize efficiency and/or performance of prior art carburation. For example, cold engine condition, an engine at idle, and an engine at wide-open throttle all require a rich fuel-air mixture. However, warm engine at cruise requires a lean fuel-air mixture. The airflow also varies greatly, as much as 100 times, between wide-open throttle and idle condition. Still another variable may be fuel formulations and characteristics.

It would be desirable to improve consistency of operation with an engine throttle body to improve carburetion while also improving performance and/or efficiency. It may also be desirable in some instances for the engine throttle body to aesthetically resemble the carburetor it is replacing, for example with the fittings in similar locations and the like.

It would also be desirable to provide a throttle body which may be used in a variety of applications, such as racing and performance street use.

The information included in this Background section of the specification, including any references cited herein and any description or discussion thereof, is included for technical reference purposes only and is not to be regarded subject matter by which the scope of the invention is to be bound.

SUMMARY

Embodiments relate to carburetor retrofit fuel injection systems.

Present embodiments provide a throttle body assembly which may be used with a variety of engines of different manufacturers. The throttle body assembly may be used to replace mechanical or hydraulically controlled carburetors with electronic fuel injection. The throttle body assembly may provide improved fuel pathways through the throttle body. The throttle bodies may have improved configuration of the fuel injectors. Further, the throttle body may have computer mounted on the throttle body and a notch formed in the throttle body to define a wire routing pathway from the computer to the injectors.

It should be appreciated that the fuel injection system may include a main throttle body and one or more fuel component covers. These fuel component covers may be oriented on the right and left sides of the main body.

According to some embodiments, an electronic fuel injection throttle body assembly comprises: a throttle body having an upper inlet and a lower outlet configured to mount to an internal combustion engine; at least one bore extending through the throttle body where the at least one bore defines the upper inlet and the lower inlet of said throttle body assembly; a fuel component cover located on a first side of the throttle body and an electronic control unit cover located on a second side of the throttle body, where the first side is about 90 degrees from the second side; at least one fuel injector disposed at least partially within the throttle body, where the at least one fuel injector is parallel to a mounting base of the throttle body; at least one connecting fuel passage extending from a fuel inlet passage, including a cross-channel passageway and a vertical passageway at least partially disposed within the fuel component cover, where the vertical passageway is in fluid communication with the at least one fuel injector; a throttle shaft extending though throttle body and at least one bore, wherein the throttle shaft is perpendicular to a horizontal direction between a first end and a second end of said at least one injector; and the at least one fuel injector directing fuel into a channel of at least one fuel distribution ring, the at least one fuel distribution ring having a plurality of fuel apertures directing fuel into a bore of said throttle body.

In some embodiments, the connecting fuel passage is on a first side of said throttle body assembly and closed such that fuel remains on said first side of said throttle body assembly. In other embodiments, the at least one bore is four bores. In still other embodiments, each of the at least one bore has two vertically aligned fuel injectors. In some embodiments, the electronic control unit is in electrical communication with at least one fuel injector.

In some embodiments, the throttle body further includes a notch for receiving at least one wire running to at least one fuel injector from the electronic control unit, and the electronic control unit further includes a cover, where the cover in combination with the notch encloses at least one wire running to the at least one fuel injector. In other embodiments, the electronic control unit further includes a plurality of strain reliefs along a lower edge of the cover configured to receive a plurality of wires. In still other embodiments, a lower edge of the cover further includes at least one U-shaped strain relief notch along a lower edge of the cover configured to hold at least one wire extending through the notch against the throttle body.

In another aspect, consistent with embodiments described herein, a throttle body assembly includes: a throttle body having an upper inlet and a lower outlet configured to mount to an internal combustion engine; at least one bore extending through the throttle body, where the at least one bore defines the upper inlet and the lower inlet of the throttle body assembly; a fuel component cover located on a first side of the throttle body and an electronic control unit and a cover mounted over the electronic control unit located on a second side of the throttle body, where the first side is about 90 degrees from the second side; at least one fuel injector disposed at least partially within the throttle body, where at least one fuel injector is parallel to a mounting base of the throttle body and the electronic control unit is in electrical communication with at least one fuel injector; at least one connecting fuel passage extending from a fuel inlet passage, including a cross-channel passageway and a vertical passageway at least partially disposed within the fuel component cover, where the vertical passageway is in fluid communication with the at least one fuel injector; and at least one fuel injector directing fuel into a fuel distribution ring, at least one fuel distribution ring having a plurality of fuel apertures directing fuel into a bore of said throttle body.

All of the above outlined features are to be understood as exemplary only and many more features and objectives of a throttle body fuel injection system or assembly may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the throttle body fuel injection system will now be described by way of examples. These embodiments are not to limit the scope of the claims as other embodiments of the throttle body fuel injection system will become apparent to one having ordinary skill in the art upon reading the instant description. Non-limiting examples of the present embodiments are shown in figures wherein:

DETAILED DESCRIPTION

Figure 1:
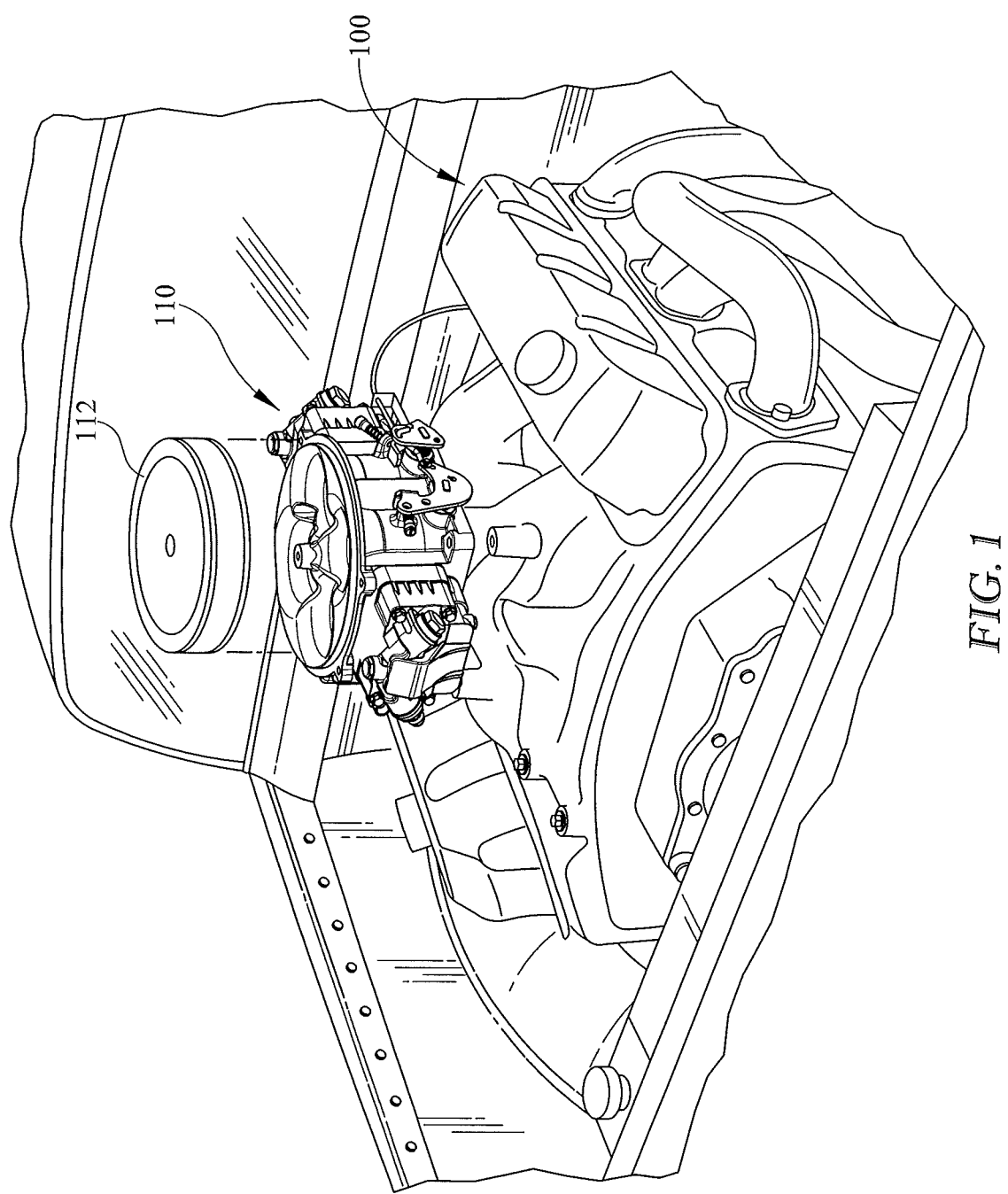
FIG. 1 is a perspective view of a combustion engine and an electronic fuel injection throttle body assembly.

It is to be understood that the electronic fuel injection throttle body assembly is not limited in its application to the details of construction and the arrangement of components set forth in the following description or illustrated in the drawings. The throttle body assembly is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-13 various embodiments of a throttle body fuel injection system. Present embodiments pertain to an electronic fuel injection throttle body assembly which may be used to retrofit older throttle body assemblies.

With reference to FIG. 1, a partial perspective view of an engine compartment is depicted wherein a combustion engine 100 is provided with an electronic fuel injection (EFI) throttle body assembly 110 and an air filter 112. The engine is illustrative as one or more throttle body assemblies 110 may be utilized and one or more filter configurations may be used to deliver air to the one or more throttle body assemblies 110. The combustion process, as one of skill in the art will be aware, combines fuel and air with an ignition source. The instant throttle body assembly 110 is mounted to the engine 100 directly such as at the manifold and receives air through the air filter 112 and receives fuel from a fuel tank and mixes the two for the ignition which occurs the engine 100. In other embodiments, the assembly 110 may be mounted to the engine indirectly such as to a supercharger.

The EFI throttle body assembly 110 is configured to be compact allowing use in a variety of configurations. Due to the wide variety of engine manufactures and vehicle types and sizes, it is desirable to provide a structure which may be used in many of these vehicles/engines. This also requires consideration of space relative to the engine hood and space relative to surrounding engine components. It may also be desirable to provide a device of minimal height, for example less than about 5 inches, a forward to rear length of about 13 inches and a side to side length of about 9 inches. These dimensions are merely illustrative of a non-limiting embodiment, but provide a compact design desirable for use across many engine sizes and vehicle types.

Figure 2:
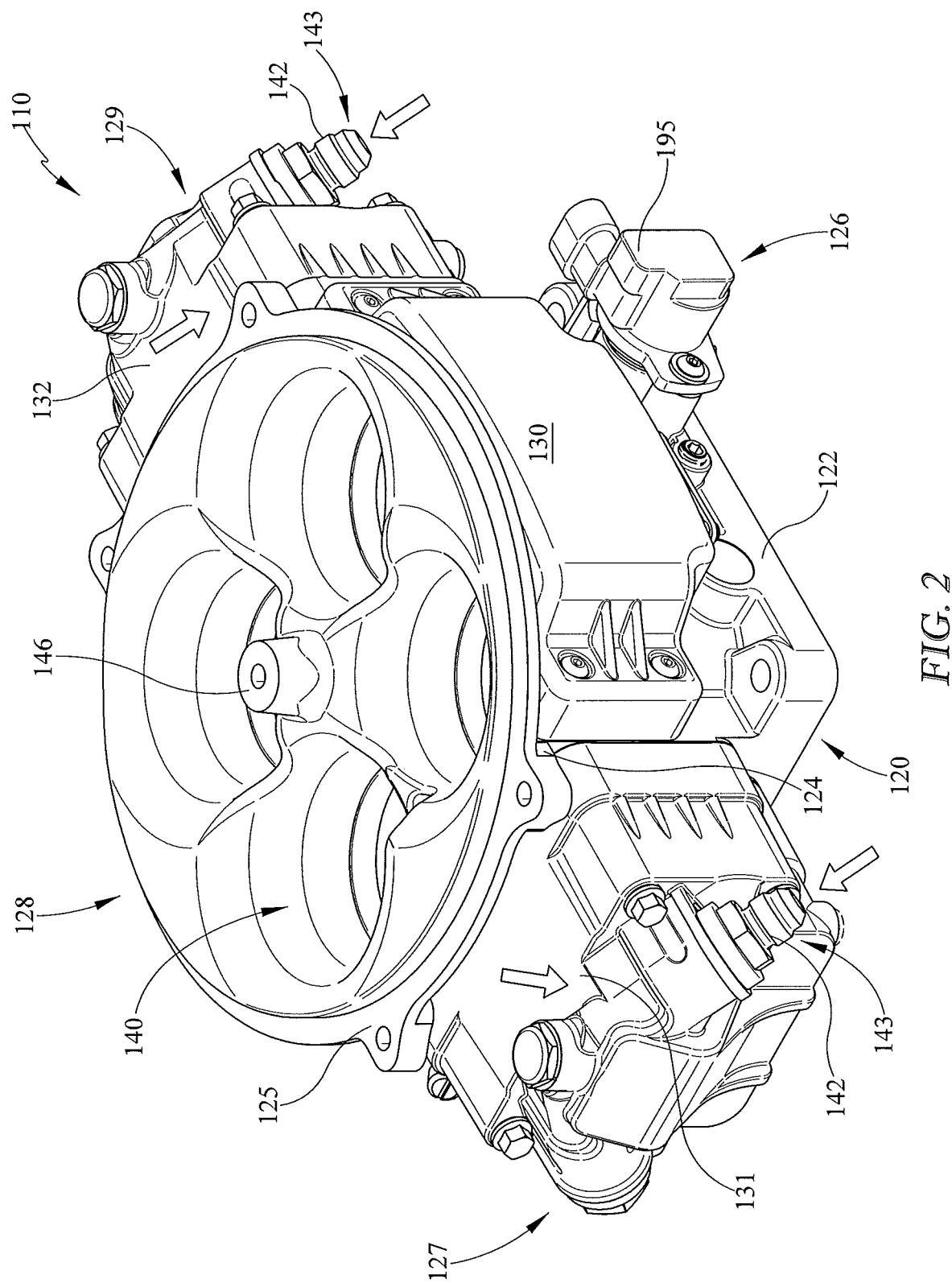
FIG. 2 is an upper perspective view of one side of the electronic fuel injection throttle body assembly removed from the engine.

With reference to FIG. 2, a front upper perspective view of the throttle body assembly 110 is illustrated. The throttle body assembly 110 includes a throttle body 120 including a mounting base 122 and a main body 124 which extends upwardly from the base 122. A stand 146 is provided between the bores 140 which supports a fastener (not shown) extending through the throttle body 120. The fastener extends up for engagement and connection of the air filter 112 (FIG. 1). The upper end of the main body 124 may include an upper flange 125. This may define a seat or upper limit for positioning of air intake structure above the throttle body assembly 110. The base 122 may have a plurality of holes for mounting the assembly 110 wherein the multiple holes provide various known bolt patterns. For example, in some embodiments, four screws may be used to mount the base; however, this is not intended to be limiting as any number of bolt patterns may be used.

The base 122 may also include various pipe ports where for example some vehicle engines require vacuum ports. For example, a manifold vacuum port, distributor spark and other may be provided along, or near the base 122 and on the throttle body 120. The ports may be plugged at time of manufacture and unplugged by the end user to make these ports functional.

The depicted embodiment shows a four barrel throttle body assembly 110. These barrels 140 are also referred to as bores 140 throughout this description. The bores 140 each may have an upper inlet and a lower inlet. Additionally, more than one throttle body assembly 110 may be used in the engine depending on the engine type and configuration of intakes.

Figure 3:
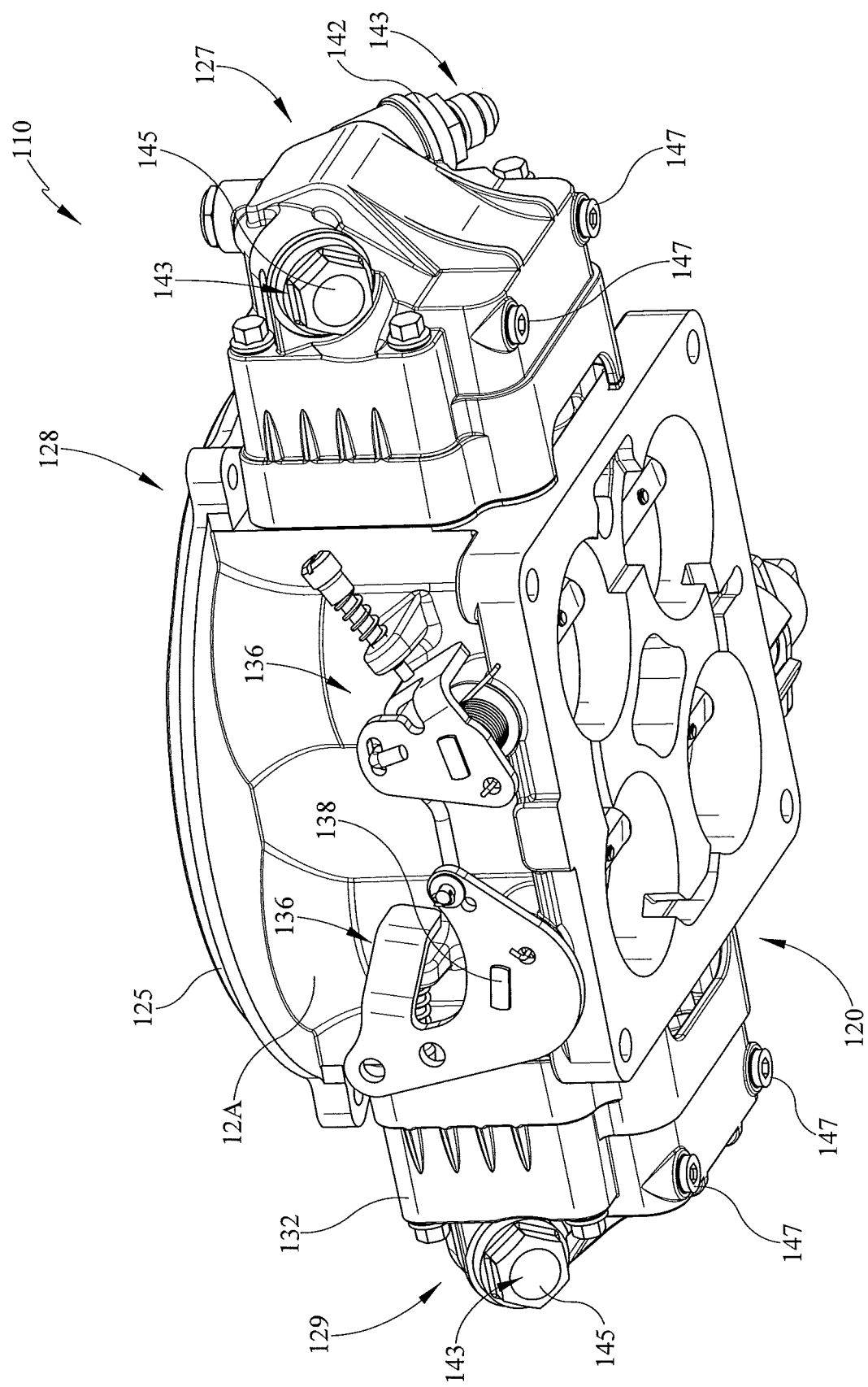
FIG. 3 is lower perspective view of a another side of the electronic fuel injection throttle body assembly.

The front of the throttle body assembly 110 is shown in the instant view. For purpose of reference of description, but not limiting, a first side 126 of the throttle body assembly 110 is shown and a second side 128 is shown in FIG. 3. Side 126 of the throttle body assembly 110 may include a cover 130. As will be described in further detail herein, the cover 130 conceals and contains an electronic control unit 190, which may be mounted to the throttle body 120 or within the cover 130, or a combination thereof. This cover 130 may be bolted to the throttle body 120 or otherwise fastened thereto.

The throttle body 120 also comprises a front side 129 and rear side 127 (FIG. 2) which are labeled for ease of reference in description. The throttle body front 129 and rear 127 include fuel components which also function as covers. The fuel component covers 131, 132 are mounted on the front and rear sides of the throttle body 120. The fuel component covers 131, 132 provide a cover for a fuel pathway and define the fuel passageway therein, which will be described in greater detail herein. The fuel component covers 131, 132 are fastened to the throttle body 120 and the cover 130 is mounted and fastened to the front of the body 120 therebetween. Again, the sides may differ in mounting position in other embodiments.

In addition to the fuel passage componentry in the fuel component covers 131, 132, these structures also cover fuel injectors 1170 (FIGS. 5-8) and mounted therein and extending into the throttle body 120. Thus the cover functionality. With the electronic control unit cover 130 positioned on the side 126 of the throttle body assembly 110 adjacent to the component covers 131, 132, the wire extending between the electronic control unit 190 (FIGS. 12 and 13) and each of the fuel injectors may remain contained and with the assembly 110 and unexposed exteriorly. The side 126 is disposed about 90 degrees from the sides 127, 129, according to some embodiments.

Figure 6:
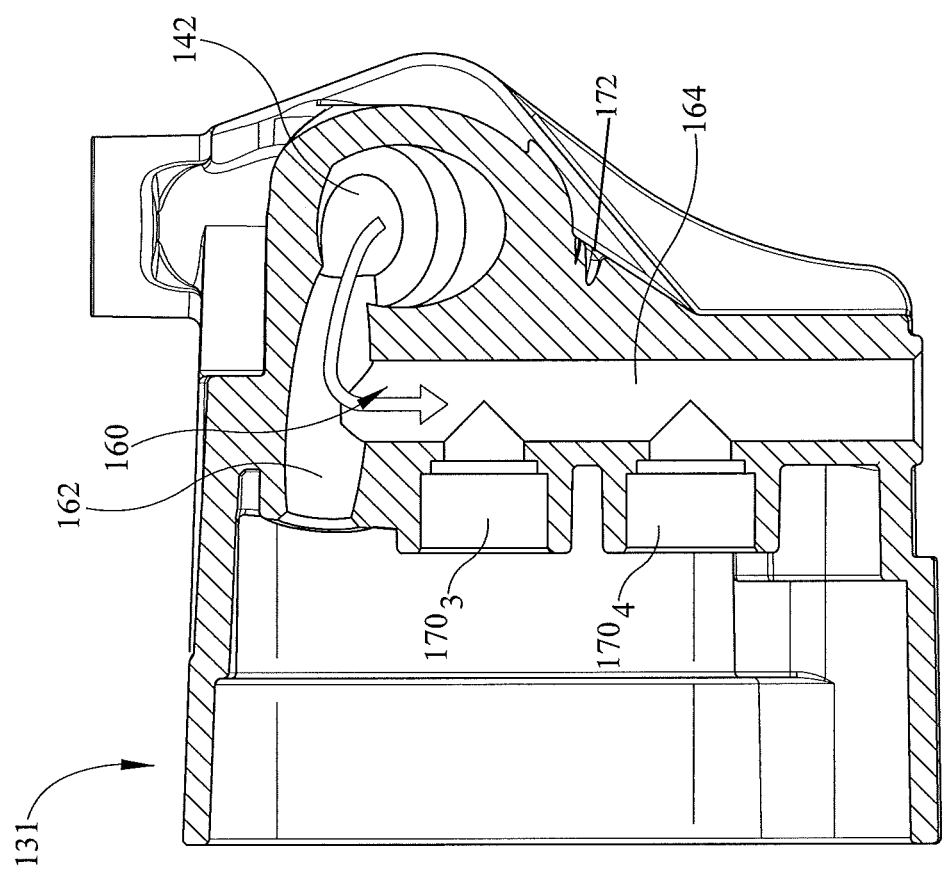
FIG. 6 is a sectional view along line 6-6 of the embodiment of FIG. 5 illustrating a connecting fuel passage.

The fuel component cover 131, 132 is also shown in FIG. 2. The fuel component cover 131, 132 may comprise one or more inlet fittings 143 which may define one or more fuel inlets 142. In some embodiments, fitting 143 may be a standard fitting such as an SAE or similar automotive fitting for ease of use and/or replacement. In some embodiments, the fittings 143 may be closed or plugged with a plus 145, such as illustrated in FIG. 3. In one embodiment, each fuel component cover 131, 132 may include a connecting fuel passage 160 (FIG. 6). These fuel passages may be oriented substantially vertically (FIG. 6). The connecting fuel passage 160 may be closed such that fuel remains on the front 129 or rear 127 of throttle body assembly 110 where the fuel entered. Fuel is routed to both fuel covers, and this may be achieved in a variety of methods. For example, in some embodiments, an end-user may use a fuel log (e.g. a length of hose, rail, or pipe with additional fittings that would plumb to the fuel covers) to transfer fuel between the two covers. In other embodiments, a fuel hose connected to a "Y" or "T" style fitting with optional additional lengths of hose or fittings may be used to plumb both fuel covers.

Referring now to FIG. 3, a lower side perspective view of the throttle body assembly 110 is shown. In this view, the lower side portion of the assembly 110 is shown for description. FIG. 3 also illustrates auxiliary inlets 147 plugs or fittings. The auxiliary inlets 147 may allow for an alternate fuel inlet location, which may be desirable depending on the engine configuration and fuel line location. For example, the fuel supply line may be split with a Y or T, as described above and directed into the inlets 147.

Figure 8:
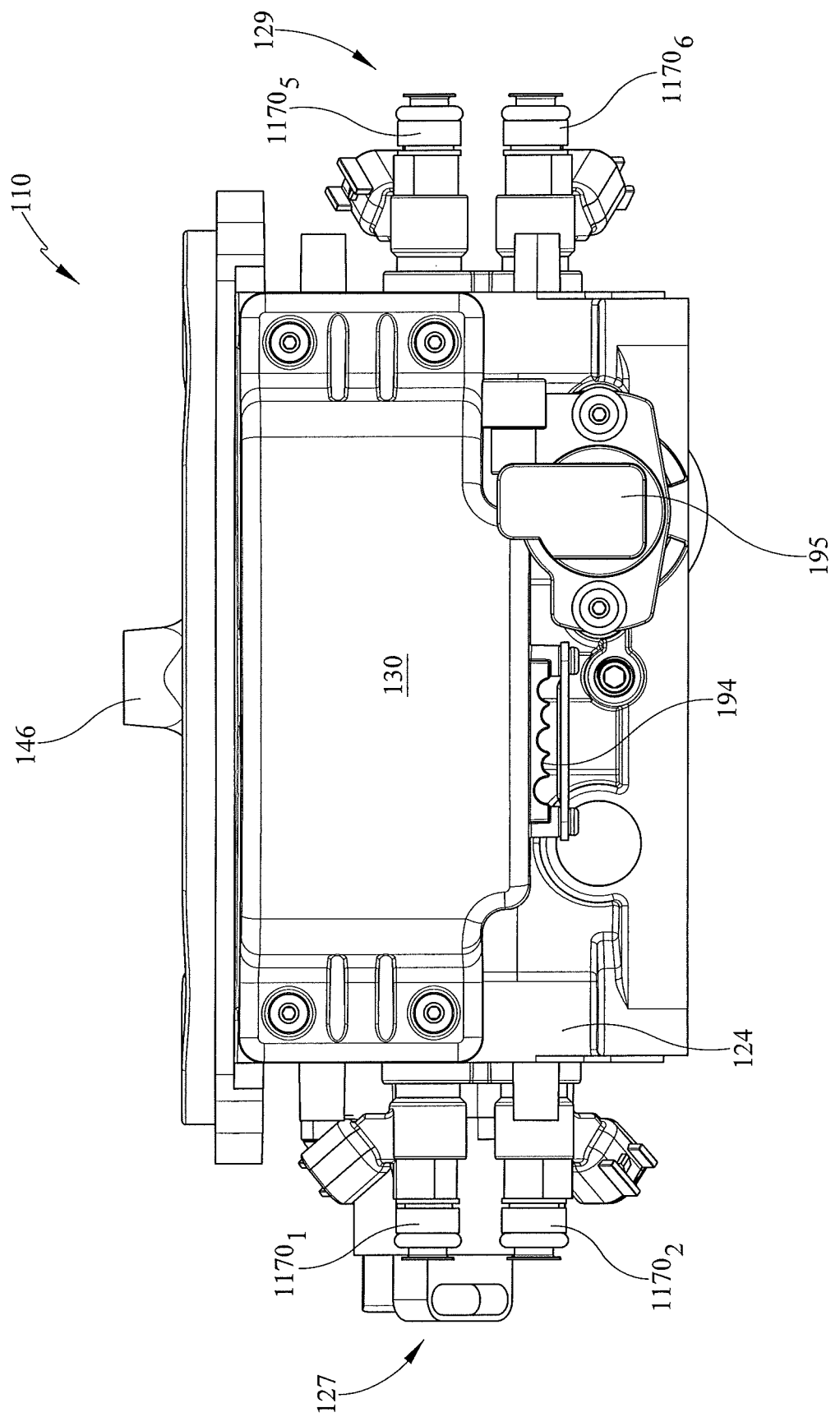
FIG. 8 is a side view of the electronic fuel injection throttle body assembly without the fuel component cover depicting an exemplary embodiment of the positioning of the fuel injectors.

The throttle lever assembly 136 may be positioned on side 128 of the throttle body assembly 110. The throttle lever assembly 136 is shown which comprises a throttle shaft 138 extending through the throttle body 120 and bores 140. The throttle shaft 138 may be oriented perpendicular to a horizontal direction between a first end and a second end of a fuel injector 1170 (FIG. 8). At the opposite side of the throttle body 120 (e.g. side 126) from the lever assembly 136 and connected to the throttle lever assembly 136 may be a throttle position sensor 195 (FIG. 2) which provides communication to the electronic control unit 190 concealed by the cover 130.

Figure 4:
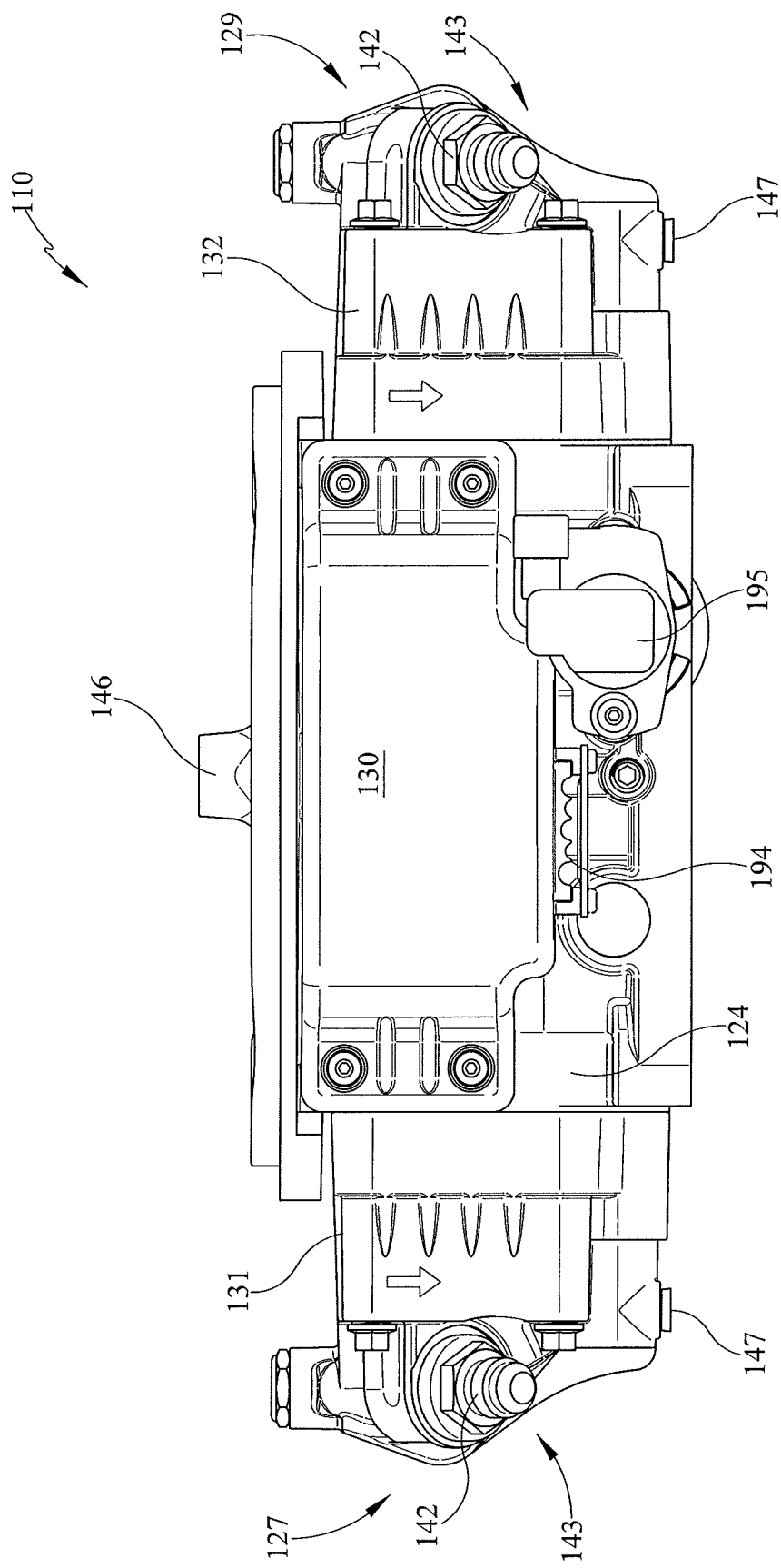
FIG. 4 is a side view of the electronic fuel injection throttle body assembly.
Figure 5:
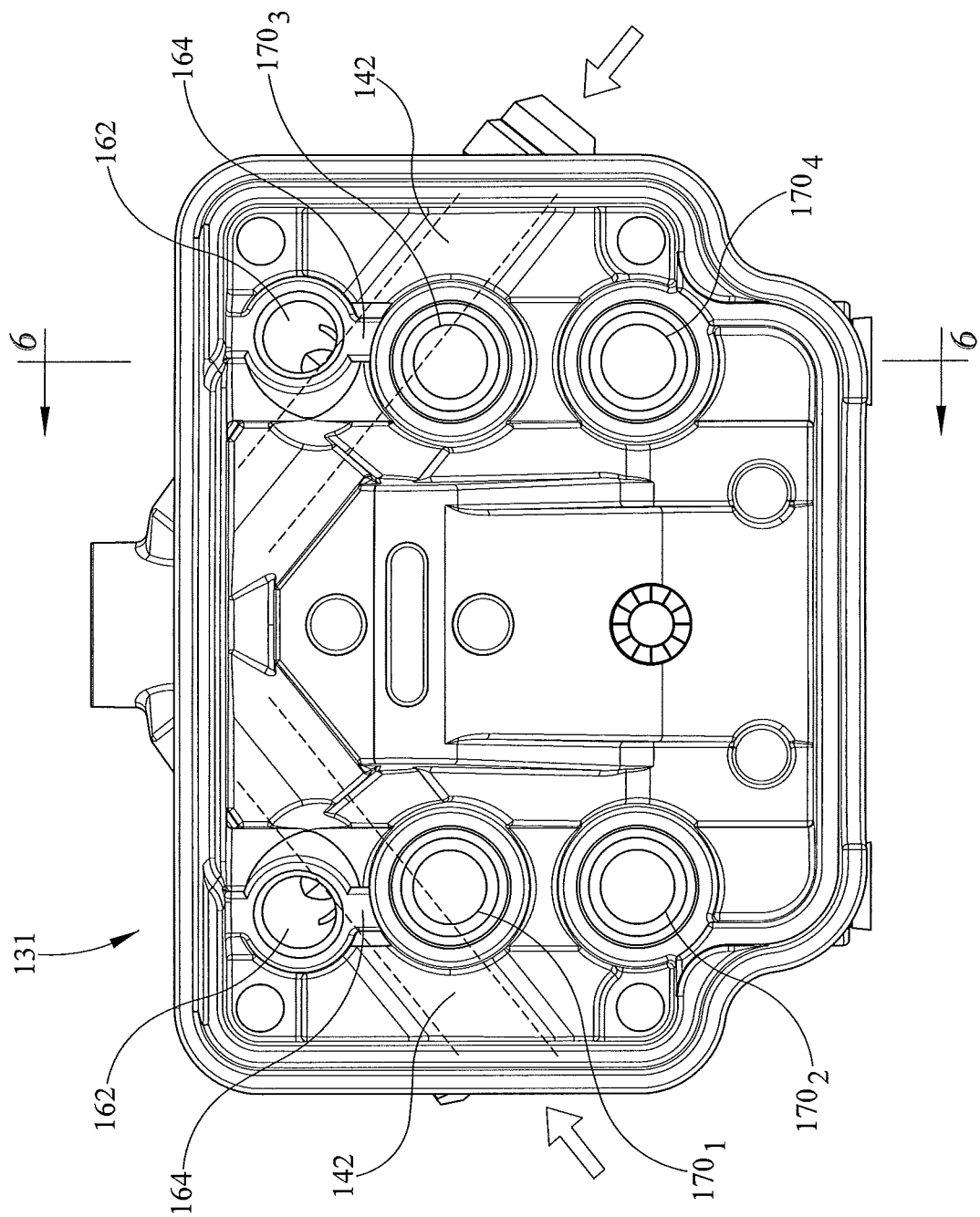
FIG. 5 is an internal front view of the fuel component cover removed from the throttle body.

Referring now to FIG. 4, a side view of the throttle body assembly 110 is shown. Large double-line arrows are shown on the exterior of the fuel component cover to depict general fuel flow therein. The fuel flow passes from the inlet 142 into the component cover 132 (see also FIG. 5) and continues vertically through the connecting fuel passage 160 and into the fuel injector ports $170_{1-n}$ (FIGS. 5 and 6). As is best illustrated in FIGS. 2 and 3, there may be two fuel inlets 142 on each the front 129 and rear 127 of the throttle body assembly 110. In some embodiments, all four fuel inlets 142 (two on each of the front 129 and rear 127) may be used. In other embodiments, only one of the two inlets 142 on each of the front 129 and rear 127 may be used, with the unused inlet 142 on each side being closed with a plug 145 (FIG. 3). The flexibility with regard to the number of fuel inlets 142 in use provides multiple installation options for varying engine configurations.

Referring now to FIG. 5, an internal front view of the fuel component cover 132 removed from the throttle body 120. The internal front view depicts fuel inlets 142 in broken line, indicating their presence on the cover 131 surface. The fuel inlets 142 receive fuel, the flow of which is indicated by the large double-line arrows shown in FIG. 5. Fuel inlets 142 may be separately machined passageways that are in fluid communication fuel injector ports $170_{1-n}$ through a connecting fuel passage 160 (FIG. 6). FIG. 6, a sectional view along line A-A of FIG. 5, further illustrates the connecting fuel passage 160. The passage 160 is generally vertical when the fuel component cover 132 is mounted to the throttle body 120.

In some embodiments, as depicted in FIG. 6, the connecting passage 160 may further comprise a cross-channel 162 and a separate vertical passageway 164, which collectively may be described as T-shaped connecting passage 160 with a substantially vertical structure, but this is not to be understood as limiting. Regardless of the particular shape, the generally vertically oriented connecting passage 160 delivers fuel from the fuel inlet(s) 142 to one or more fuel injector ports 1701, and ultimately to the fuel injectors $1170_{1-n}$ (FIG. 8). As fuel flows through the inlet(s) 142 the passage 160 fills with fuel, the fuel then enters the one or more fuel injector ports $170_{1-n}$ as illustrated by the double-line arrow. Furthermore, the connecting fuel passage 160 may be closed, meaning there is no crossover between front 129 and rear 127 of the throttle bottle assembly 110. In such embodiments, both inlets 142 on each the front 129 and rear 127 of the throttle body assembly 110 may be utilized.

In some embodiment, the fuel component cover 131, 132 and inlets thereto may remain constant, but the fuel flow may change. For example, in some embodiments, there may optionally be multiple horizontal passages that could be serviced by a single vertical passageway. However, there may be other space and/or structural considerations to consider when routing fuel. For example, an IAC motor 193 (FIG. 9) may require that fuel be routed a certain way.

Figure 7:
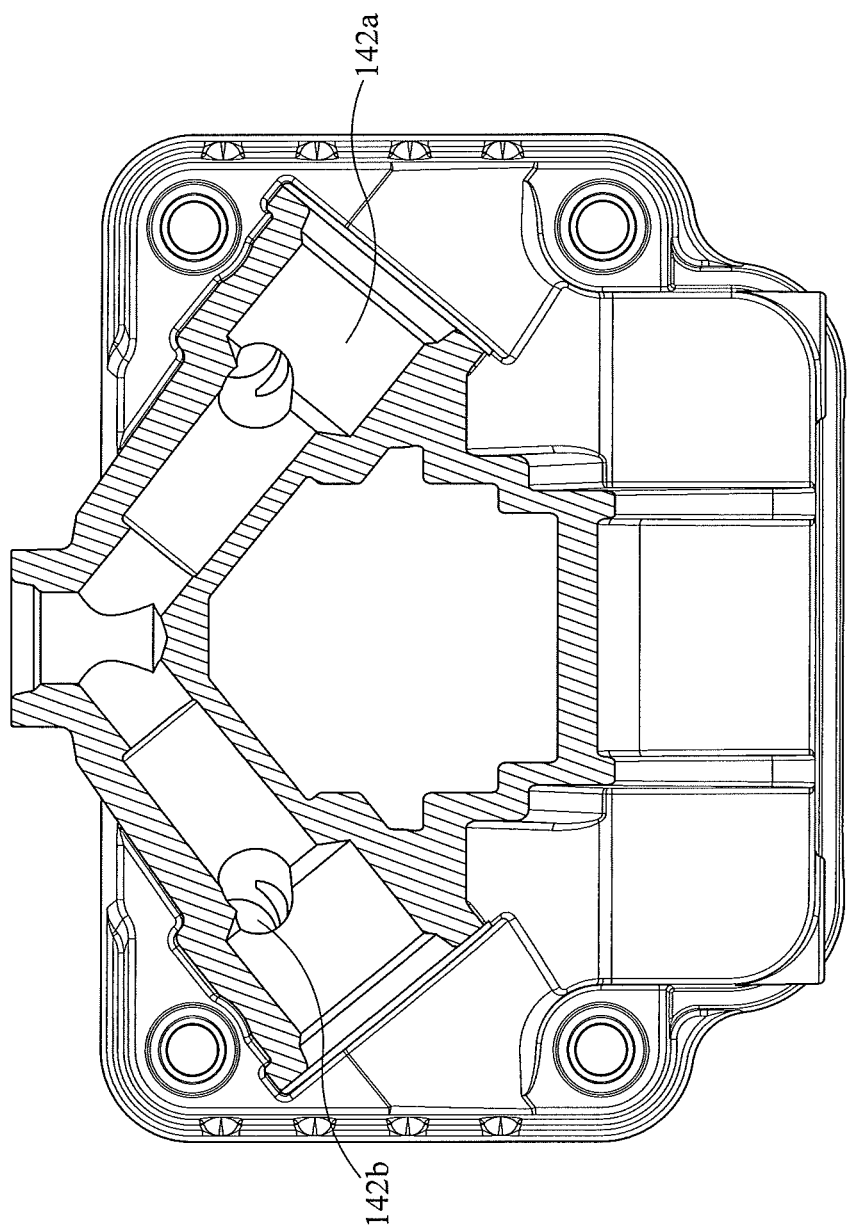
FIG. 7 is a sectional view through the fuel inlets of the throttle body assembly.

Referring now to FIG. 7, a cross sectional view through the fuel inlets 142 of the throttle body assembly 110 is illustrated. As shown in FIG. 7, fuel inlets 142 may be connected, and thus fuel may flow from a first inlet 142a on, for example the front 129, to a second inlet 142b.

As also illustrated in FIGS. 5 and 6, fuel injector ports $170_{1-n}$ (and thus fuel injectors $1170_{1-n}$ themselves) may be vertically stacked one on top of another and oriented horizontally such that they are substantially parallel to the base 122 of the throttle body 120 (also see FIG. 8); however, this is not intended to be limiting as the fuel injectors may also be positioned angularly.

FIG. 5-8 illustrate the throttle body assembly 110 as having two horizontally oriented (e.g. parallel with the base 122), vertically stacked fuel injectors per bore; however, fuel injectors 1170 may be inserted based on size of the engine and/or performance requirements. When larger engines are utilized and higher horsepower is required, more fuel injectors 1170 may be desirable. Practically speaking, and merely for non-limiting example, the throttle body 120 may be cast for example with two ports per bore 140, in the stacked vertical arrangement already described and shown in FIGS. 5 and 6. During subsequent manufacturing, depending on the need for one injector or two injectors per bore, the additional injector bore may be machined to accept an injector. Alternatively, rather than not machining all of the cast ports of each bore, all of the ports could be machined but the unused ports could be closed with a plug. Therefore, at some point in the future, an end user or a manufacturer could subsequently unplug any plugged ports for use of additional fuel injectors.

Figure 9:
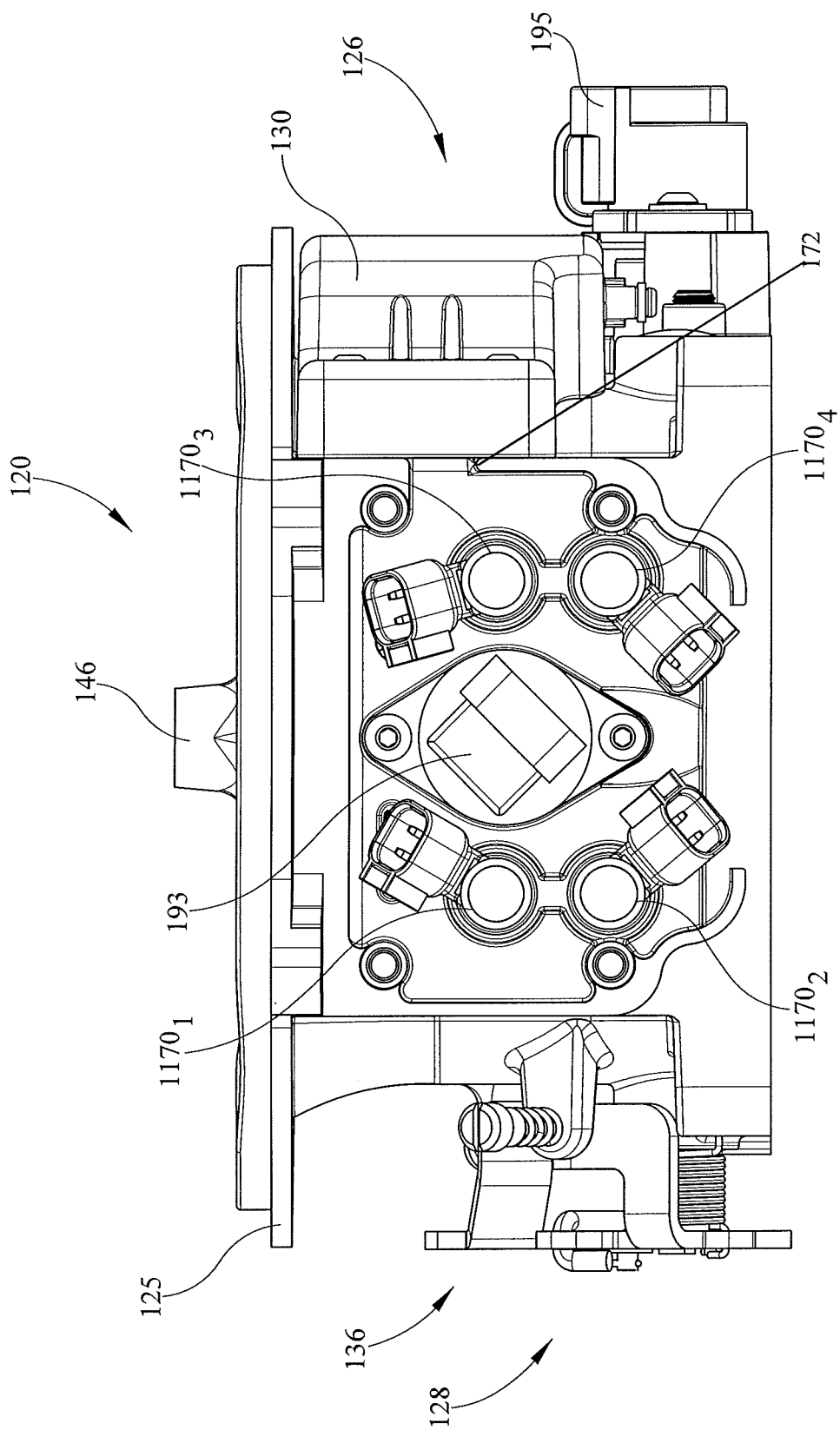
FIG. 9 is a side view of the electronic fuel injection throttle body assembly, according to the embodiment of FIG. 8.

Referring now to FIGS. 8 and 9, where FIG. 8 is a side view of the electronic fuel injection throttle body assembly 110 without the fuel component cover 131, 132 is illustrated, which depicts an exemplary embodiment of the positioning of the fuel injectors $1170_{1-n}$, and FIG. 9 is a front sectional view of the electronic fuel injection throttle body 120. With reference to FIGS. 5-9 the fuel injector ports $170_{1-n}$ and fuel the injectors $1170_{1-n}$ may be slightly inset from the bore centerline. In some embodiments, this slight inset, may be necessary in order to fit all components into a traditionally shaped and/or size carburetor fuel bowl. The fuel injectors $1170_{1-n}$ illustrated in FIGS. 8 and 9 may extend from the injector ports $170_{1-n}$ (FIG. 5) into the throttle body 120. As illustrated in the embodiments discussed herein, the fuel injectors $1170_{1-n}$ may be oriented such that they are parallel to the base 122 of the throttle body assembly; however, this is not intended to be limiting, as in other embodiments the fuel injectors $1170_{1-n}$ may be oriented in an angled (for example downward) direction into the bore(s) 140.

Figure 10:
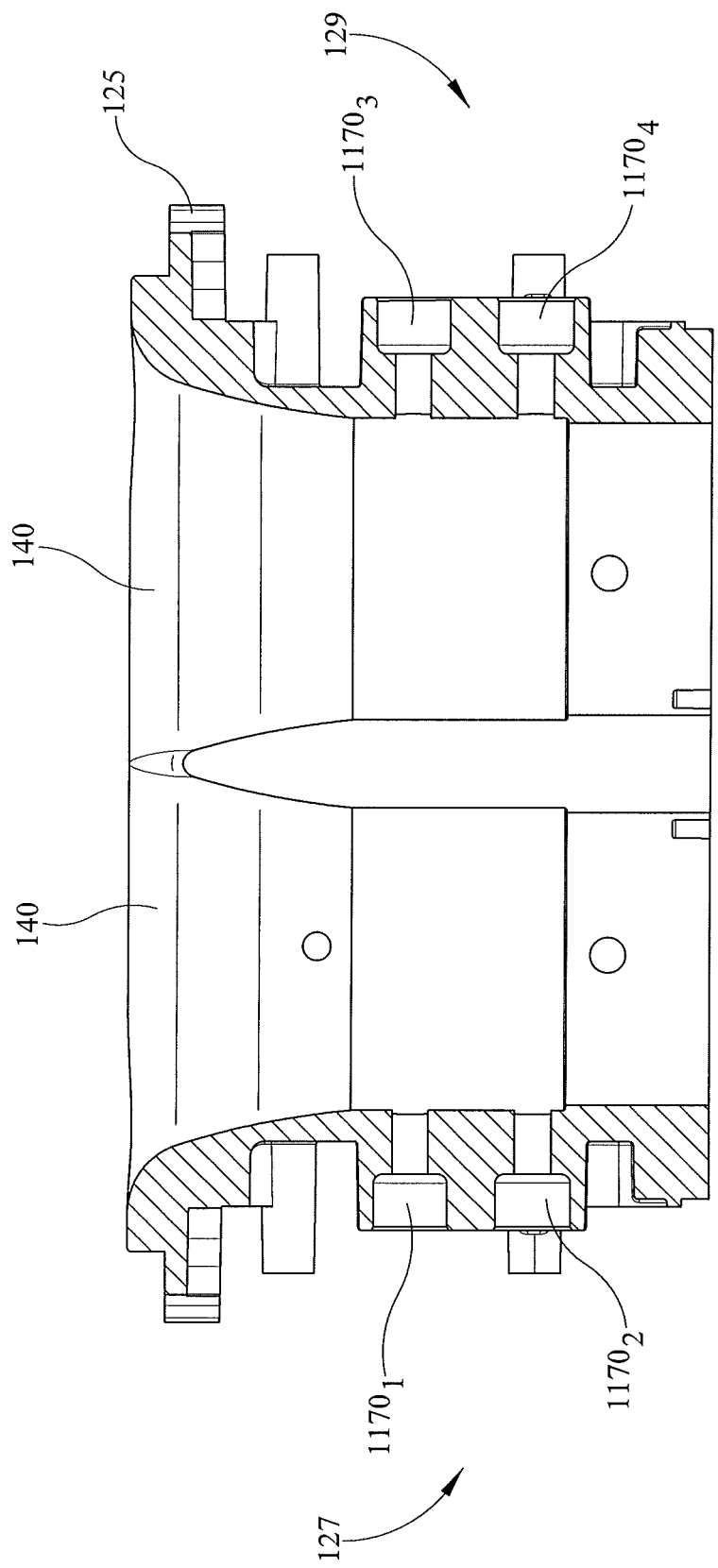
FIG. 10 is a first sectional view of the electronic fuel injection throttle body.

Referring now to FIG. 10, a first sectional view of the throttle body assembly 110 is provided. The sectional view is taken through a fuel injector 1171 and port 171. In this view, the horizontal orientation of the fuel injectors $1170_{1-n}$ is illustrated. The injectors $1170_{1-n}$ may deliver fuel as directed by the electronic control unit 190 to the bores 140. The bores 140 may include apertures through which the fuel passes to a fuel ring 152 or sleeve (FIG. 11).

Figure 11:
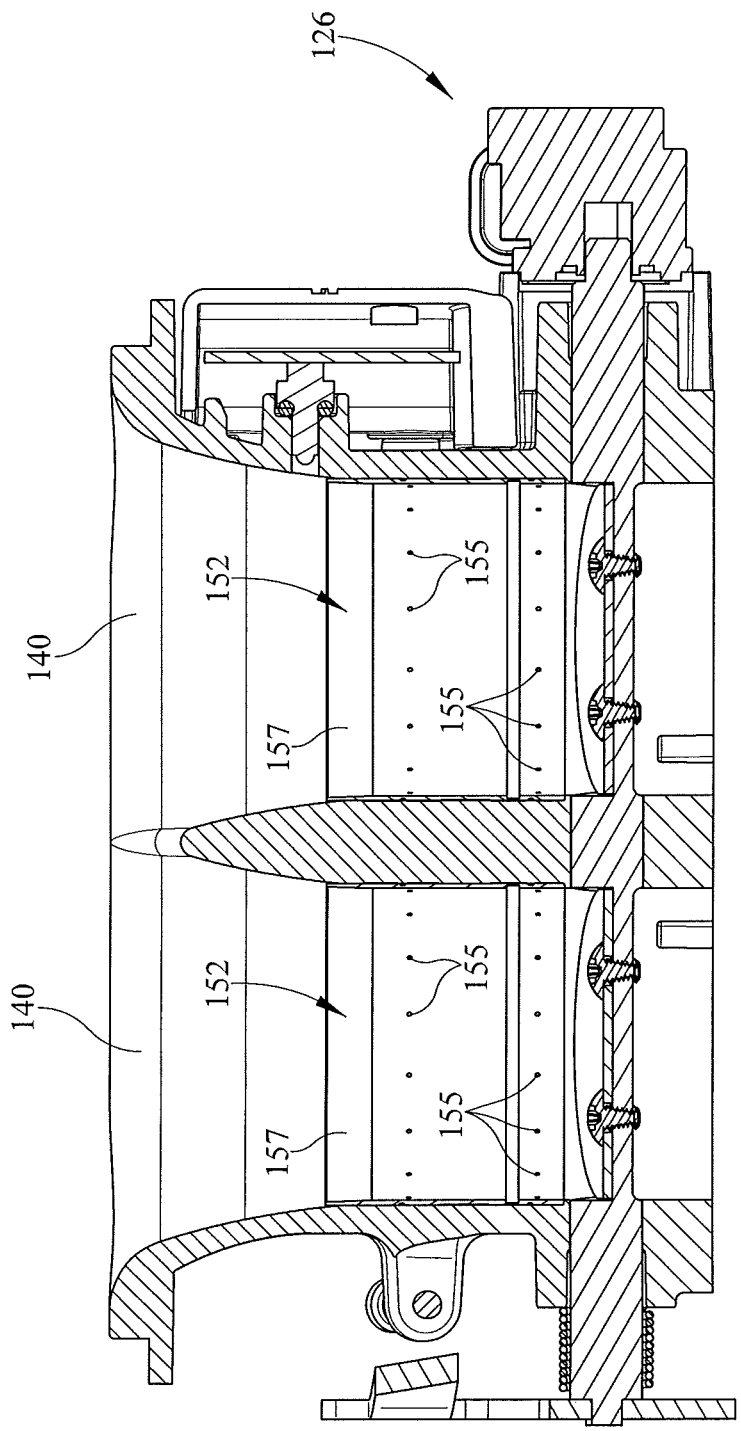
FIG. 11 is a second sectional view of the electronic fuel injection throttle body.

Referring now to FIG. 11, a second sectional view of the throttle body assembly 110 is provided. The bores 140 include apertures through which the fuel passes to a fuel ring or sleeve 152. The ring or sleeve 152 is generally cylindrical in shape and has hollowed interior with open ends. The ring or sleeve 152 directs fuel through a channel (not visible in FIG. 11) on the outer surface of the ring 152 and through apertures 155, into the bore 140. The ring or sleeve 152 in combination with the inner diameter of the bores 140 form the channel wherein fuel passes to a plurality of apertures 155 located in the rings 152.

In embodiments with only one fuel injector per bore, there may be only a single row of apertures 155 in the ring 152. However, in embodiments with two fuel injectors per bore there may be a second row of apertures 155 may be found on some rings 152 (as illustrated in FIG. 11). As illustrated in FIG. 11, the first and second rows of aperture 155 may be disposed at two elevations.

The ring 152 may be formed in the shape of a substantially cylindrically shaped inner wall or may alternatively have a venture shape. The upper ends of the rings 152 may also have a slight taper along at least the outer surface to improve sealing of the rings within the bores 140. Further, the height of the rings 152 may also be shorter than the length of the bores 140.

One advantage of the device described herein is that the electronic control unit 190 is provided on the throttle body 120. Wires extend to the injectors $1170_{1-n}$ of the injector ports 1701, for control of the injectors by the ECU 190 as well as other wires to other electronic components.

Figure 12:
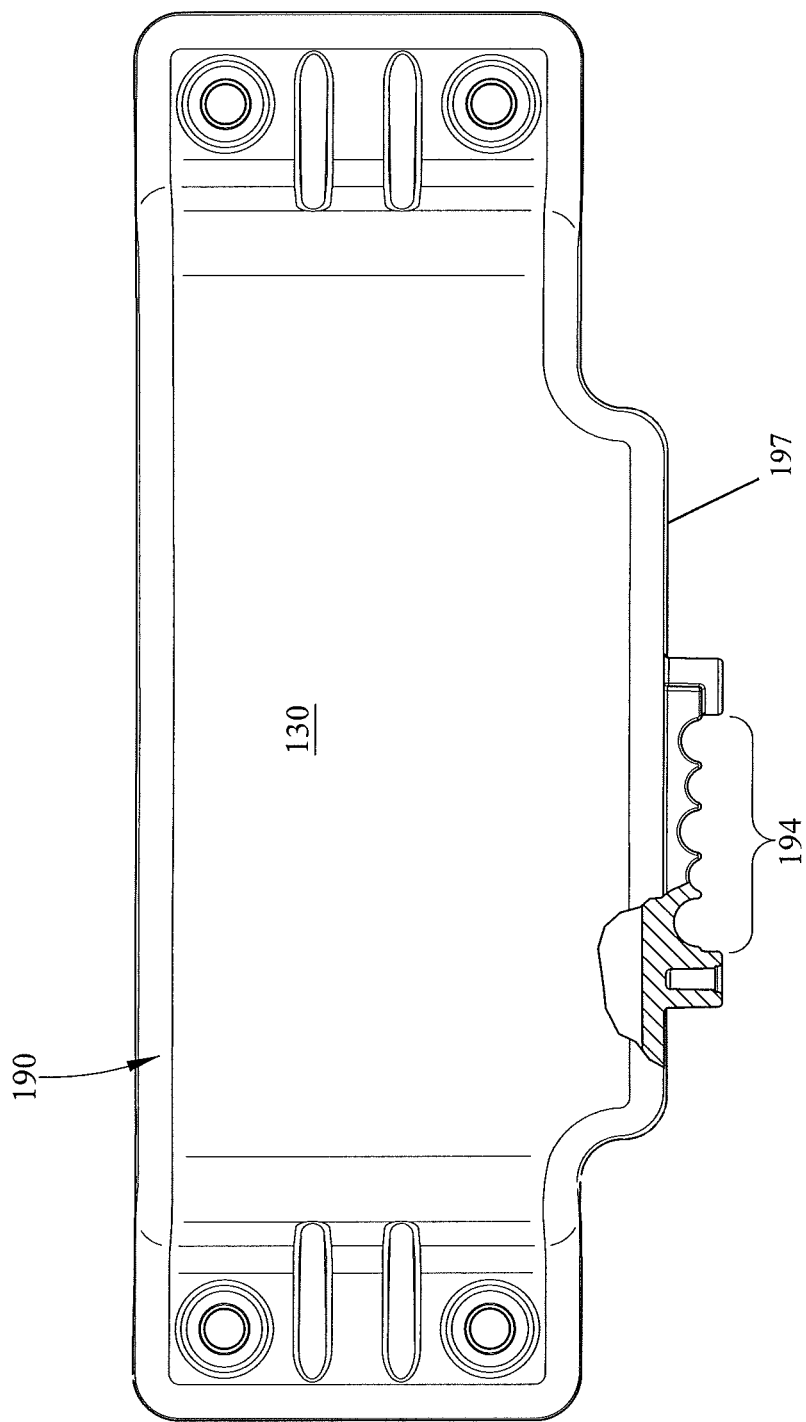
FIG. 12 is a front view of the electronic control unit cover.

Referring now to FIG. 12, a front view of the ECU cover 130 (located on side 126) is shown. The ECU 190 is positioned on side 126 of the throttle body assembly 110, directly opposite of the throttle lever 136, which is located on side 128 of the throttle body assembly. Along a lower edge 197 of the cover 130 are strain reliefs 194. The strain reliefs 194 allow for wiring to exit from within the cover 130 and be routed about the throttle body 120 to various components providing service to or from the ECU 190. The strain reliefs may be of same size or may be of differing sizes to accommodate differing gauges of wire. For example, a wire connected to the oxygen sensor (not shown) with the ECU 190 may come out of the bottom of the ECU cover 130 and placed into the strain relief 194. Other wires that may extend out of the bottom of the ECU cover 130 and be placed into the strain relief 194 may include, but are not limited to, wiring for a handheld, power, and the like. In some embodiments, all the strain reliefs 194 may be used by a wire extending from the ECU; while in other embodiments, one or more strain reliefs 194 may remain unused. Although, described as the containing the ECU, this is not limiting. In some embodiments, an ECU cover 130 may be used without an ECU 190.

Figure 13:
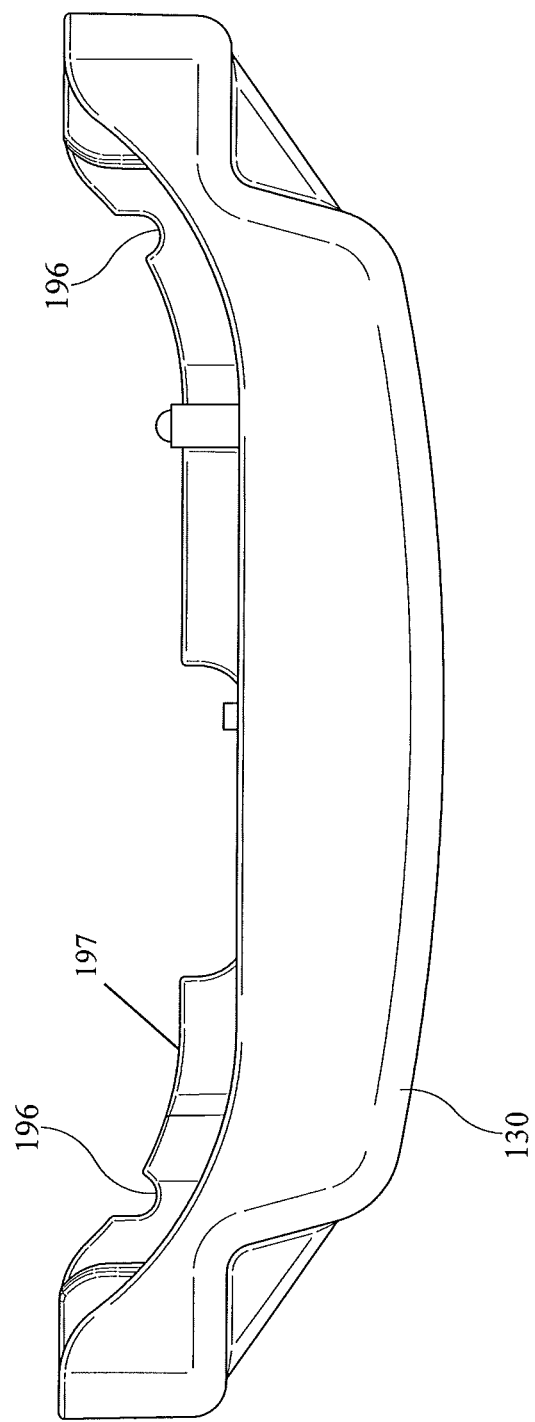
FIG. 13 is a bottom view of the electronic control unit cover.

Referring now to FIG. 13, a bottom view of the ECU cover 130 (located on side 126) is shown. The lower edge 197 of the ECU cover 130 further comprises at least one additional U-shaped strain relief notch 196. In some embodiments, there may two U-shaped strain relief notches 196, as illustrated in FIG. 13. These U-shaped strain reliefs 196 are cast into the cover 130 may hold the wire(s) that extend through them against the throttle body 120. In some embodiments, the wire for the throttle position senor (TPS)

and coolant temperature sensor may pass through these U-shaped strain reliefs 196 and be held against the body.

Wiring for the fuel injectors 1170$_{1-n}$ (FIGS. 8 and 9) and an intake air temperature (IAT) sensor (which is concealed in the fuel cover and not illustrated) may exit though the side of the ECU cover and be received by a notch 172 (FIGS. 6 and 9) for of the throttle body 120 and be routed through channels in the throttle body and remain covered and/or enclosed by the EUC cover 130 and the throttle body 120.

The ECU cover 130 may be connected to the throttle body 120, for example by fasteners or otherwise removably connected. The electronic control unit 190 may be a printed circuit board, and may further comprise memory to which operating code may be flashed. The electronic control unit 190 may be connected to the cover 130 for example by one or more fasteners and may also be potted to reduce effects of contaminants, water, noise, vibration or other environmental influences. Alternatively, the electronic control unit 190 may be connected to the throttle body 120 and then covered by the cover 130.

The electronic control unit 190 or "controller" is used herein generally to describe various apparatus relating to the monitoring of engine data, user input and the performance of one or more actions in response to occurrence of certain engine sensor data or action from user. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may also include a printed circuit board and may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

In various implementations, a processor or controller may be associated with one or more storage media (generically referred to herein as "memory" e.g., volatile and non-volatile computer memory such as RAM, PROM, EPROM, and EEPROM, floppy disks, compact disks, optical disks, magnetic tape, etc.). In some implementations, the memory may be encoded with one or more programs that, when executed by the controller, perform at least some of the functions discussed herein. Memory may be fixed within a processor or controller or may be transportable, such that the one or more programs stored thereon can be loaded into a processor or controller so as to implement various aspects of implementations disclosed herein.

The described throttle body assembly 110 may not include a pressure regulator; however, in some instances an end-user may desire such, and may add a pressure regulator to the assembly after manufacturing.

One skilled in the art should now understand that the electronic fuel injection throttle body assembly 110 also comprises modular applications. By defining many common mounting points and features for the various throttle body subassemblies such as fuel component covers, main bodies, electronic control units, rings and injectors, interchangeability is increased which allows engineers to mix and match the subassemblies to create new throttle body assemblies for new applications.

These new applications may be desired to increase airflow, fuel capacity, fuel inlet/outlet plumbing configurations and mounting locations of various subcomponents to clear other external obstacles (such as air cleaner assemblies). These different applications may be further defined by characteristics such as engine size or configuration, which includes throttle bore number, size, orientation or mounting interface. The applications and characteristics may, in turn, dictate the size, number and placement and potentially concealment of the fuel injectors, as well as the placement of the ECU (if employed).

With this in mind, it may be desirable to provide modular features for the throttle body assembly to meet any number or combination of these desired characteristics and/or applications. For example, the position and number of fuel injectors may vary. As described previously, various number of injector ports may be cast or formed, but not all used in each application. Furthermore, the throttle body assembly may also be scaled smaller, using fewer than four bores (for example, two or one bore). In some embodiments, the throttle body assembly may be "split" in half (e.g. only contain two bores); however, this may require some reconfiguration of some component, for example the ECU 190 may be rotated 90 degrees, scaled down in size, and/or relocated to the rear of the unit.

Further, the throttle body 120 may also be machined to be used as an air valve only. That is, no injector ports, no fuel routed through the assembly.

Interchangeability of components also lends itself in the multiple assembly application side by side on an existing intake manifold. This is also referred to as a 2×4 application. In such an application each throttle body assembly 110 may be rotated about 90 degrees from a typically single assembly application.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a"

and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of methods and embodiments of the invention has been presented for purposes of illustration. It is not intended to be exhaustive or to limit the claims to the precise steps and/or forms disclosed, and obviously many modifications and variations are possible in light of the above teaching. It is intended that the scope of the embodiments and all equivalents be defined by the claims appended hereto.

What is claimed is:

1. A throttle body assembly, comprising:
   a throttle body having an upper inlet and a lower outlet configured to mount to an internal combustion engine;
   at least one bore extending through said throttle body, wherein the at least one bore defines said upper inlet and said lower outlet of said throttle body assembly;
   a fuel component cover located on a first side of said throttle body and an electronic control unit located on a second side of said throttle body, wherein said first side is about 90 degrees from said second side;
   at least one fuel injector disposed at least partially within said throttle body, wherein said at least one fuel injector is parallel to a mounting base of said throttle body;
   at least one connecting fuel passage extending from a fuel inlet passage, comprising a cross-channel passageway and a vertical passageway at least partially disposed within said fuel component cover and extending for fluid communication between said at least one fuel injector and a second fuel injector, and wherein said vertical passageway is capable of feeding the second fuel injector which is capable of being positioned at least partially within said throttle body relative to the same at least one bore as the at least one fuel injector;
   a throttle shaft extending though the throttle body and at least one bore, wherein said throttle shaft is perpendicular to a horizontal direction between a first end and a second end of said at least one fuel injector; and
   said at least one fuel injector directing fuel into a channel of at least one fuel distribution ring, said at least one fuel distribution ring having a plurality of fuel apertures directing fuel into a bore of said throttle body.

2. The throttle body assembly of claim 1, wherein said at least one connecting fuel passage is on a first side of said throttle body assembly and closed such that fuel remains on said first side of said throttle body assembly.

3. The throttle body assembly of claim 1 wherein said at least one bore is four bores.

4. The throttle body assembly of claim 1 wherein each of said at least one bore has two vertically aligned fuel injectors.

5. The throttle body assembly of claim 1 where said electronic control unit is in electrical communication with said at least one fuel injector.

6. The throttle body assembly of claim 5, wherein said throttle body further comprises a notch for receiving at least one wire running to said at least one fuel injector from said electronic control unit, and said electronic control unit further comprises an electronic control unit cover, wherein said electronic control unit cover in combination with said notch encloses at least one wire running to said at least one fuel injector.

7. The throttle body assembly of claim 6, wherein said electronic control unit cover further comprises a plurality of strain reliefs along a lower edge of said electronic control unit cover configured to receive a plurality of wires.

8. The throttle body assembly of claim 7, wherein the lower edge of said electronic control unit cover further comprises at least one U-shaped strain relief notch along the lower edge of said electronic control unit cover configured to hold said at least one wire extending through said notch against said throttle body.

9. A throttle body assembly, comprising:
   a throttle body having an upper inlet and a lower outlet configured to mount to an internal combustion engine;
   at least one bore extending through said throttle body, wherein the at least one bore defines said upper inlet and said lower outlet of said throttle body assembly;
   a fuel component cover located on a first side of said throttle body and an electronic control unit cover mounted over an electronic control unit, said electronic control unit and said electronic control unit cover located on a second side of said throttle body, wherein said first side is about 90 degrees from said second side;
   at least one fuel injector disposed at least partially within said throttle body, wherein said at least one fuel injector is parallel to a mounting base of said throttle body and said electronic control unit is in electrical communication with said at least one fuel injector;
   at least one connecting fuel passage extending from a fuel inlet passage, comprising a cross-channel passageway and a vertical passageway at least partially disposed within said fuel component cover, wherein said vertical passageway is in fluid communication with said at least one fuel injector and a second fuel injector, both of said at least one fuel injector and said second fuel injector providing fuel to said at least one bore, and wherein said vertical passageway is capable of feeding the second fuel injector which is capable of being positioned at least partially within said throttle body; and
   said at least one fuel injector directing fuel into at least one fuel distribution ring, said at least one fuel distribution ring having a plurality of fuel apertures directing fuel into a bore of said throttle body.

10. The throttle body assembly of claim 9, wherein said electronic control unit cover fully encloses at least one wire running from a side edge of said electronic control unit cover to said at least one fuel injector.

11. The throttle body assembly of claim 9, wherein said electronic control unit cover further comprises a plurality of strain reliefs along a lower edge of said electronic control unit cover configured to receive a plurality of wires.

12. The throttle body assembly of claim 11, wherein the lower edge of said electronic control unit cover further comprises at least one U-shaped strain relief notch along the lower edge of said electronic control unit cover configured to hold at least one wire extending through said at least one U-shaped strain relief notch against said throttle body.

* * * * *